United States Patent
Adams et al.

(10) Patent No.: US 8,541,078 B2
(45) Date of Patent: Sep. 24, 2013

(54) FUEL SUPPLIES FOR FUEL CELLS

(75) Inventors: Paul Adams, Monroe, CT (US);
Andrew J. Curello, Hamden, CT (US);
Floyd Fairbanks, Naugatuck, CT (US);
Alain Rosenzweig, Saint-Maur des Fosses (FR)

(73) Assignee: Societe BIC, Clichy Cedex (FR)

( * ) Notice: Subject to any disclaimer, the term of this patent is extended or adjusted under 35 U.S.C. 154(b) by 1913 days.

(21) Appl. No.: 10/913,715

(22) Filed: Aug. 6, 2004

(65) Prior Publication Data

US 2006/0030652 A1    Feb. 9, 2006

(51) Int. Cl.
*B32B 1/02*   (2006.01)
*B32B 1/08*   (2006.01)

(52) U.S. Cl.
USPC ....... 428/35.7; 428/36.4; 428/36.5; 428/36.6; 428/36.7; 428/36.8; 428/36.9

(58) Field of Classification Search
USPC ............... 428/34.1, 34.4, 34.6, 34.7, 35.7, 428/36.4, 36.5, 36.6, 36.7, 36.8, 36.9
See application file for complete search history.

(56) References Cited

U.S. PATENT DOCUMENTS

| | | | |
|---|---|---|---|
| 3,457,337 A | 7/1969 | Turner | |
| 4,713,269 A | 12/1987 | Jabarin et al. | |
| 4,763,805 A | 8/1988 | Strock | |
| 4,868,026 A | 9/1989 | Shimizu et al. | |
| 4,956,232 A | 9/1990 | Balloni et al. | |
| 4,980,100 A | 12/1990 | Krishnakumar | |
| 5,337,923 A | 8/1994 | Lugez et al. | |
| 5,425,470 A | 6/1995 | Duhaime et al. | |
| 5,518,141 A | 5/1996 | Newhouse et al. | |
| 5,882,728 A | 3/1999 | Buschges | |
| 6,460,733 B2 * | 10/2002 | Acker et al. | 222/94 |
| 6,756,140 B1 * | 6/2004 | McAlister | 429/20 |

(Continued)

FOREIGN PATENT DOCUMENTS

| | | |
|---|---|---|
| EP | 0664418 A | 1/1995 |
| JP | H09-77136 | 3/1997 |
| WO | 98/29245 A | 7/1998 |
| WO | 9829245 A2 | 7/1998 |

OTHER PUBLICATIONS

Definition of "valve" from plastomatic.com website (http://www.plastomatic.com/definition.html), accessed Oct. 29, 2009, © 1997-2005, 5 total pages.*

(Continued)

*Primary Examiner* — Walter B Aughenbaugh
(74) *Attorney, Agent, or Firm* — The H.T. Than Law Group

(57) ABSTRACT

Fuel cartridges for fuel cells are disclosed. One fuel cartridge has an outer casing, an inner liner containing fuel, and a valve component adapted to transport fuel from the fuel supply to a fuel cell. The outer casing and the inner liner are made by blow molding and as the fuel is transported from the fuel supply, the inner liner pulls away from the outer casing. Another fuel cartridge includes an outer casing, an inner liner containing fuel, and a valve component adapted to transport fuel from the fuel supply to a fuel cell. The inner liner is integral to the outer casing at a region proximate to the location of the valve component. The inner liner and/or the outer casing can be fluorinated, coated with a barrier material or wrapped with a barrier film to reduce vapor permeation.

60 Claims, 4 Drawing Sheets

(56) References Cited

U.S. PATENT DOCUMENTS

| | | | |
|---|---|---|---|
| 7,172,825 B2 | 2/2007 | Adams et al. | |
| 2002/0197522 A1 | 12/2002 | Lawrence et al. | |
| 2003/0082427 A1* | 5/2003 | Prasad et al. | 429/34 |
| 2003/0215655 A1 | 11/2003 | Barger et al. | |
| 2004/0245138 A1 | 12/2004 | Penttinen et al. | |
| 2005/0017397 A1 | 1/2005 | Silagy et al. | |

OTHER PUBLICATIONS

International Search Report and Written Opinion for PCT/US05/26667 Mailed on Oct. 30, 2007.

International Preliminary Report on Patentability issued in connection with parent application PCT/US2005/026667 on Nov. 29, 2007.

European Search Report, issued in connection with corresponding European Patent Application No. 05777494.5 on Aug. 18, 2009.

Machine translation of JP 09-77136 to Kishi.

European Search Report issued in connection with the corresponding European Patent Application No. 11191691.2 on Apr. 17, 2012.

European Search Report issued in connection with the corresponding European Patent Application No. 11191714.2 on Apr. 17, 2012.

Extended European Search Report issued in connection with the corresponding European Application No. 11191714.2 on Jul. 10, 2012.

* cited by examiner

FUEL SUPPLIES FOR FUEL CELLS

FIELD OF THE INVENTION

This invention generally relates to fuel cell supplies, and more particularly to fuel supplies with reduced permeation rate and blow molded fuel supplies.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Some fuel cells utilize compressed hydrogen ($H_2$) as fuel. Compressed hydrogen is generally kept under high pressure, and is therefore difficult to handle. Furthermore, large storage tanks are typically required and cannot be made sufficiently small for consumer electronic devices. Proton exchange membrane (PEM) fuel cells use methanol ($CH_3OH$), metal hydrides (such as sodium borohydride ($NaBH_4$)), hydrocarbons (such as butane) or other fuels reformed into hydrogen fuel. Conventional reformat fuel cells require reformers and other vaporization and auxiliary systems to convert fuel to hydrogen to react with oxidant in the fuel cell. Recent advances make reformer or reformat fuel cells promising for consumer electronic devices. Other PEM fuel cells use fuels, such as methanol ($CH_3OH$), directly ("direct methanol fuel cells" or DMFC). DMFC, where methanol is reacted directly with oxidant in the fuel cell, is the simplest and potentially smallest fuel cell, and also has promising power application for consumer electronic devices. Solid oxide fuel cells (SOFC) convert hydrocarbon fuels, such as butane, at high heat to produce electricity. SOFC requires relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-reaction at the anode:

$$CH_3OH + H_2O \rightarrow CO_2 + 6H^+ + 6e^-$$

Half-reaction at the cathode:

$$1.5O_2 + 6H^+ + 6e^- \rightarrow 3H_2O$$

The overall fuel cell reaction:

$$CH_3OH + 1.5O_2 \rightarrow CO_2 + 2H_2O$$

Due to the migration of the hydrogen ions ($H^+$) through the PEM from the anode to the cathode and due to the inability of the free electrons ($e^-$) to pass through the PEM, the electrons must flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated herein by reference in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

Another fuel cell reaction for a sodium borohydride reformer fuel cell is as follows:

$$NaBH_4 \text{ (aqueous)} + 2H_2O \rightarrow \text{(heat or catalyst)} \rightarrow 4(H_2) + (NaBO_2) \text{ (aqueous)}$$

Half-reaction at the anode:

$$H_2 \rightarrow 2H^+ + 2e^-$$

Half-reaction at the cathode:

$$2(2H^+ + 2e^-) + O_2 \rightarrow 2H_2O$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. published patent application No. 2003/0082427, which is incorporated herein by reference.

One of the more important features for fuel cell application is fuel storage. The fuel supply should also be easily inserted into the fuel cell or the electronic device that the fuel cell powers. Additionally, the fuel supply should also be easily replaceable or refillable. Although fuel cartridges for fuel cells have been discussed in the patent literature, there has been no known disclosure concerning manufacturing techniques for fuel cartridges.

SUMMARY OF THE INVENTION

The present invention is directed to a fuel supply for fuel cells wherein one or more components of the fuel supply are blow molded.

The present invention is directed to a fuel supply for a fuel cell comprising an outer casing, an inner liner containing fuel, and a valve component adapted to transport fuel from the fuel supply to a fuel cell. The outer casing and the inner liner are made by blow molding and when the fuel is transported from the fuel supply, the inner liner at least partially pulls away from the outer casing.

The outer casing and the inner liner can be made from polymers that are incompatible to each other, and the outer casing and the inner liner are molded substantially simultaneously. One of the outer casing and inner liner comprises a polar resin and the other one comprises a non-polar resin. Polar resins comprise acrylonitrile butadiene styrene, thermoplastic polyesters, polycarbonates, polyvinyl chloride, polyamides, polyarylene ethers, or thermoplastic polyurethanes. Non-polar resins comprise high density polyethylene (HDPE), polypropylene or polystyrene.

Alternatively, one of the outer casing and inner liner is made from a thermoplastic elastomer such as butyl rubber and the other is made from acetal or polyvinyl chloride.

Alternatively, one of the outer casing and inner liner comprises polyethylene, and the other one comprises a slip agent. Suitable slip agents include long chain fatty acid amide, oleamide erucamide or hydrophilic fillers.

Alternatively, an intermediate layer is disposed between the outer casing and the inner liner, and the intermediate layer is incompatible with at least one of the outer casing or inner liner. The intermediate layer can be a wax.

Alternatively, the outer casing and the inner liner are blow molded sequentially, and the outer casing is blow molded and cooled before the inner liner is blow molded.

The present invention is directed to a fuel supply for a fuel cell comprising an outer casing, an inner liner containing fuel, and a valve component adapted to transport fuel from the fuel supply to a fuel cell. Preferably, the inner liner is integral to the outer casing at a region proximate to the location of the valve component. Preferably, the outer casing and the inner liner are made by blow molding, and more preferably by co-extrusion blow molding or by sequential blow molding.

The present invention is directed to a fuel supply for a fuel cell comprising an outer casing, an inner liner containing fuel, and a valve component adapted to transport fuel from the fuel supply to a fuel cell. The inner liner is blow molded. Preferably, the inner liner is blow molded into the outer casing. Alternatively, the inner liner is blow molded and then inserted into the outer casing. The inner liner when fully filled can have a volume higher than that of the outer casing, and the inner liner may have at least one foldable sidewall.

The present invention is further directed to a fuel supply for a fuel cell comprising an outer casing, an inner liner containing fuel, and a valve component adapted to transport fuel from the fuel supply to a fuel cell. The outer casing and/or inner liner can be modified to increase its vapor barrier. The outer casing and/or the inner liner can be coated with a gas barrier coating. The outer casing and/or the inner liner can be covered or wrapped with a gas barrier film. The outer casing and/or the inner liner can be fluorinated, and may include an anti-oxidant.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
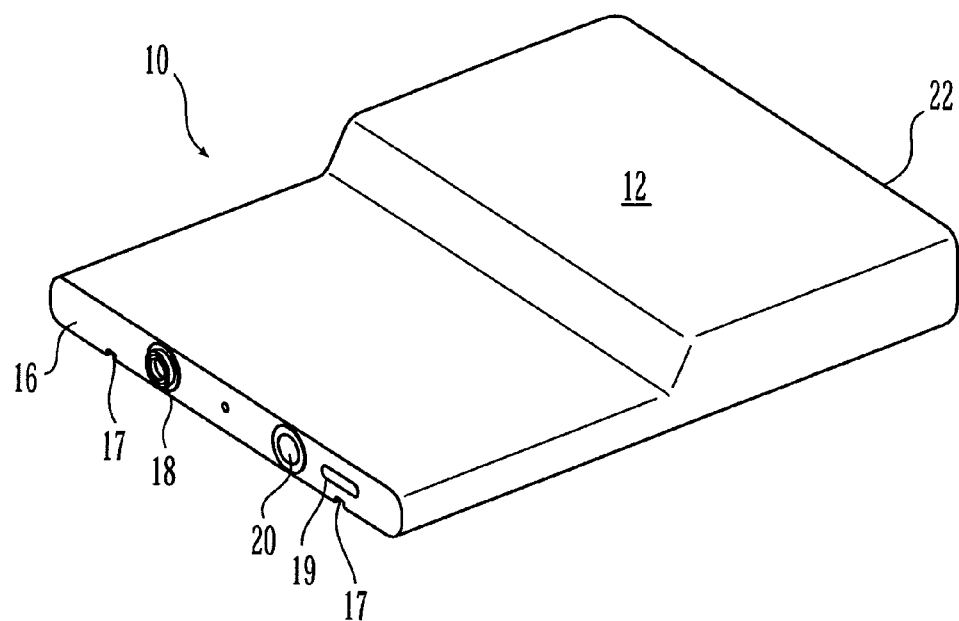
FIGS. 1-3 are perspective views of exemplary fuel cartridges that can be manufactured by blow molding.

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cell and reformat fuel cell, among others. The fuel supply may contain other types of fuel cell fuels, such as ethanol or other alcohols, chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in U.S. published patent application No. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include metal hydrides, such as sodium borohydride ($NaBH_4$), and water, discussed above. Fuels further include hydrocarbon fuels, which include, but are not limited to, butane, kerosene, alcohol and natural gas, disclosed in U.S. published patent application No. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gasses, liquids, solids and/or chemicals and mixtures thereof As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel reservoirs, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies.

The fuel supply of the present invention can also be used to store fuels that are not used in fuel cells. These applications include, but are not limited to, storing hydrocarbons and hydrogen fuels for micro gas-turbine engine built on silicon chips, discussed in "Here Come the Microengines," published in The Industrial Physicist, (December 2001/January 2002) at pp. 20-25. Other applications include storing traditional fuels for internal combustion engines, and hydrocarbons, such as butane for pocket and utility lighters and liquid propane.

Figure 2:
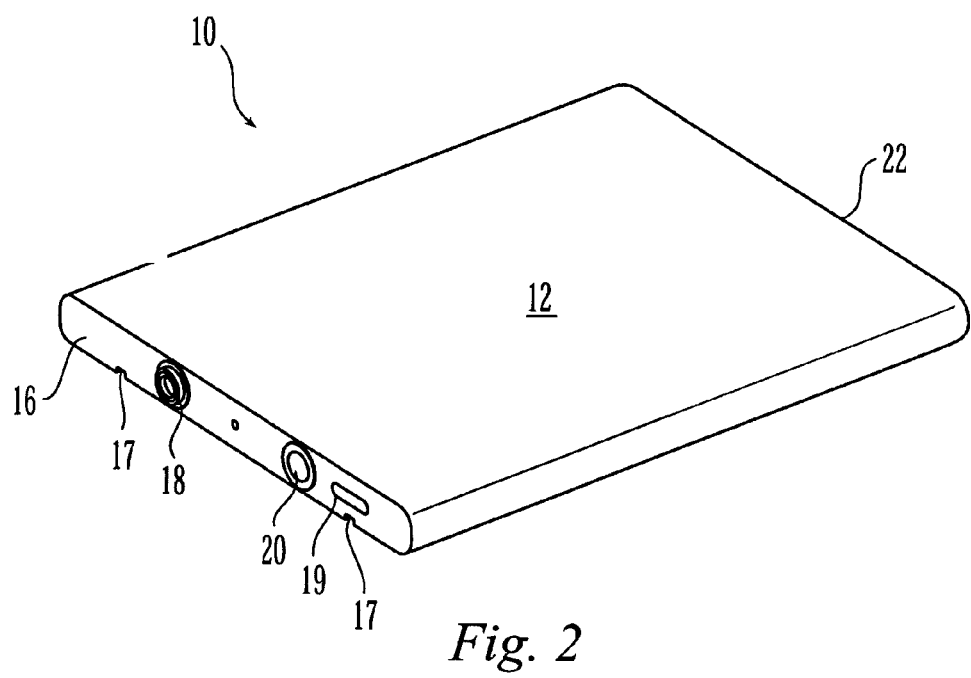
Figure 3:
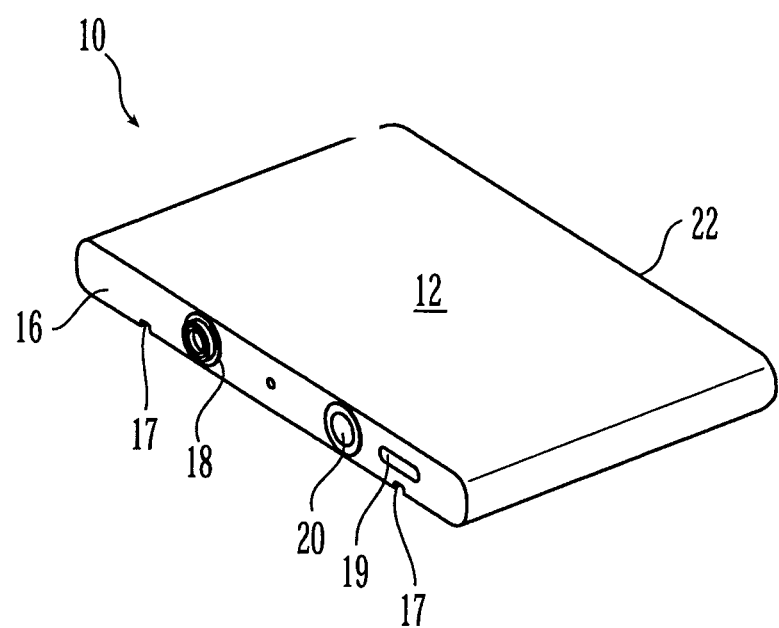
Figure 4:
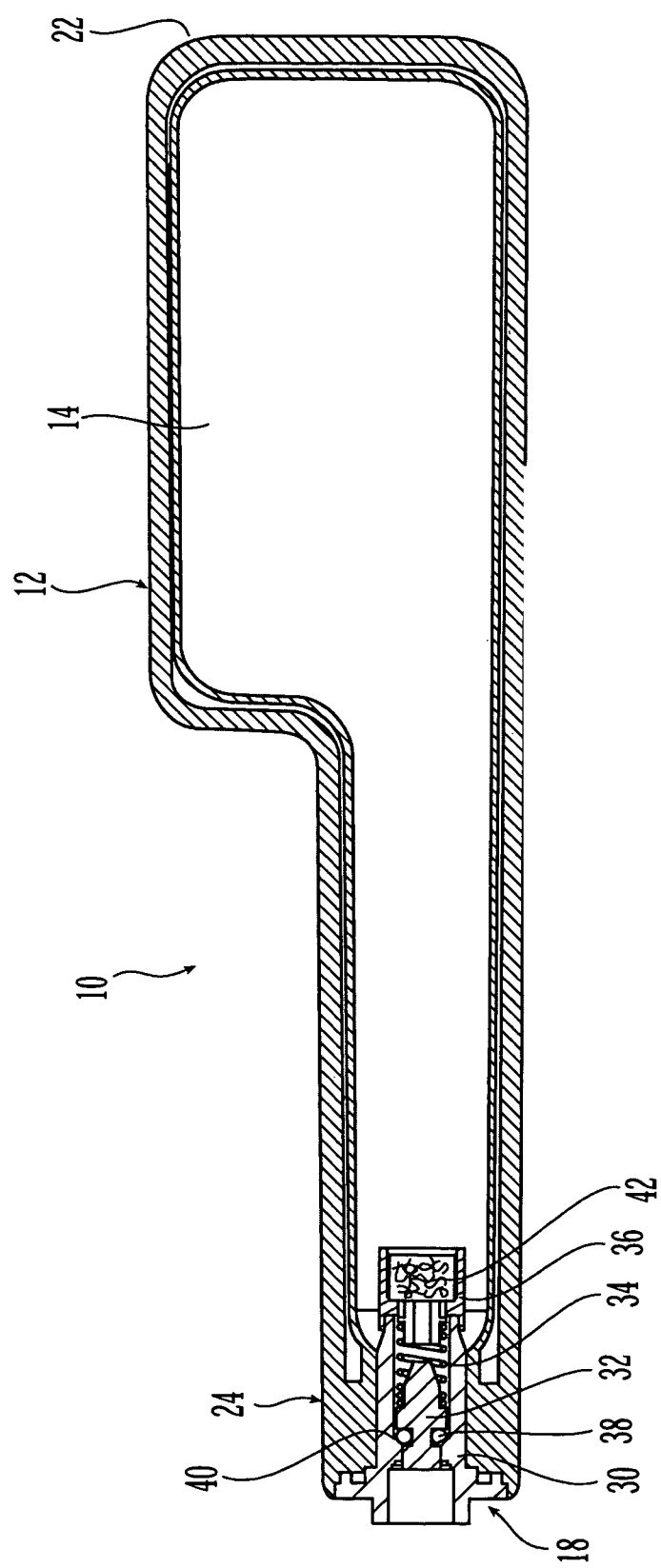
FIG. 4 is a cross sectioned view of the exemplary fuel cartridge of FIG. 1.

Referring to FIGS. 1-3, exemplary fuel cartridge 10 can have any shape, and is sized and dimensioned to supply fuel to fuel cells and to fit directly into the fuel cells, into predetermined receiving slots on electronic devices that the fuel cells power or into chargers powered by fuel cells. Referring to FIG. 4, cartridge 10 has outer casing 12 and inner bladder or liner 14, which contains the fuel. Preferably, outer casing 12 is more rigid than liner 14, and protects the inner liner, which is preferably flexible. Cartridges that comprise an outer casing and an inner liner are fully disclosed in commonly owned, co-pending U.S. patent application Ser. No. 10/629,004, entitled "Fuel Cartridge with Flexible Liner," filed on Jul. 29, 2003, commonly owned, co-pending U.S. patent application Ser. No. 10/725,244, entitled "Fuel Cell Supply Having Fuel Compatible Materials," filed on Dec. 1, 2003, and U.S. design patent application Ser. No. 29/199,298, entitled "Fuel Supplies for Fuel Cells," filed on Feb. 12, 2004. The '004, '244 and '298 applications are incorporated herein by reference in their entireties.

At front side 16, cartridge 10 has valve 18 and fill port 20. Fill port 20 is used to transport fuel to liner 14 during the manufacturing process and is sealed after a predetermined amount of fuel, e.g., about 85% to 95% of the capacity of liner 14, has been transported into the cartridge. During the fuel filling process, air may exit through valve 18 to facilitate the filling process. Alternatively, fill port 20 can be a refilling valve so that cartridge 10 can be refilled for multiple uses.

Referring to FIGS. 1 to 3, cartridge 10 defines on its underside at least one guide rail 17, which is adapted to glide or slide on a corresponding rail on the device (not shown) to facilitate the insertion of the cartridge and/or to control the orientation of the cartridge. Additionally, front side 16 also defines electrical interface 19, which may contain the necessary electrical system and contacts to connect the cartridge to the electronic device or to the fuel cell that powers the electrical device. Electrical interface 19 may also contain or be connected to an electrically readable fuel gage, security devices or an information storage device, such as an EEPROM or a read/write radio frequency tag. These devices can be attached on the cartridge or be positioned inside the cartridge. Fuel gages, security devices and information storage devices are fully disclosed in co-pending application entitled "Fuel Cell System Including Information Storage Device and Control System," filed on even date herewith. This co-pending patent application is incorporated herein by reference in its entirety.

Referring to FIG. 4, valve 18 houses the first valve component of a two-component shut-off valve. The second matching valve component (not shown) of the shut-off valve is similar to the valve component shown in FIG. 4, and resides in or on the fuel cell or the electronic device that the fuel cell powers. Two component shut-off valves are fully disclosed in commonly owned, co-pending patent application Ser. No. 10/629,006 entitled "Fuel Cartridge with Connecting Valve," filed on Jul. 29, 2003. This patent application is also incorporated herein by reference in its entirety. The first valve component housed in valveI 8 comprises valve body 30, and plunger 32 slidingly disposed within valve body 30. Spring 34 is held in compression within valve body 30 and is supported by spring retainer 36. Spring 34 biases plunger 32 outward, thereby pressing inner O-ring 38 against valve seat surface 40 to form a seal within the first valve component. Preferably, spring retainer 36 contains a porous filler, absorbent material or retention material 42 to regulate the transport of fuel through the first valve component. Filler, absorbent materials and retention materials are fully discussed in the '004 application. The porous filler, absorbent material or retention material can be located anywhere in the first (or second) valve component, or it can be located between the two corresponding valve components. It can be located upstream or downstream relative to the valve component or within the valve component.

In one embodiment, to open the first valve component, a portion of the second matching valve component, such as the valve body, contacts and pushes plunger 32 against the biasing force of spring 34. Inner O-ring 38 is then moved away from valve seat surface 40 to allow fuel to be transportable from liner 14 through filler 42 and the internal channel of spring retainer 36 and around plunger 32 to the fuel cell. Alternatively, another plunger from the second valve component contacts plunger 32 and pushes plunger 32 backward against the biasing force of spring 34.

The first valve component also contains an outer O-ring forming an inter-component seal between the first valve component and the second valve component when the valve body of the second valve component is inserted through the O-ring. Preferably, the inter-component seal is established before fuel is transported out of liner 14. Advantageously, the outer O-ring is attachable to the cartridge, so that a fresh O-ring is available for use when a new cartridge is installed. Preferably, fuel is not transported to the fuel cell until the seal in the second valve component is opened and the outer O-ring forms a seal between the first valve component and the second valve component.

Other valves can be used with cartridge 10, including but not limited to the valve disclosed in U.S. published patent application No. 2003/0082427, which is incorporated herein by reference in its entirety. This reference discloses a self-sealing redundant septum/ball-and-spring valve system. Connected to the fuel supply is a poppet-type valve that has a ball biased by a spring against a septum or sealing surface. The septum is adapted to receive a hollow needle and the needle pushes the ball against the spring to open the valve. As the needle is withdrawn, the ball is pressed against the septum to re-establish the seal and the septum closes to provide a redundant seal. The ball is analogous to plunger 32, and the septum is analogous to O-ring 38 and sealing surface 40. The present invention is not limited to any particular valve.

At rear side 22, cartridge 10 can have an optional vent disposed thereon to allow air in the cartridge to vent when the liner is being filled. The optional vent also allows air to enter the cartridge as fuel is transported from the cartridge to prevent a partial vacuum from forming inside the cartridge, and also prevents liquid from exiting the cartridge. Preferably, the vent has a membrane that allows air or other gases to enter or leave the cartridge, but keeps liquid from entering or leaving the cartridge. Such gas permeable, liquid impermeable membrane is disclosed in co-pending '004 patent application and in U.S. Pat. No. 3,508,708, entitled "Electric Cell with Gas Permeable Vent Stopper," issued on Apr. 21, 1970, and in U.S. Pat. No. 4,562,123, entitled "Liquid Fuel Cell," issued on Dec. 31, 1985. The disclosures of these references are incorporated herein by reference in their entireties. Such membranes can be made from polytetrafluoroethylene (PTFE), nylon, polyamides, polyvinylidene, polypropylene, polyethylene or other polymeric membrane. Commercially available membranes include hydrophobic PTFE microporous membrane from W.L Gore Associates, Inc. and similar membranes from Millipore, Inc. Goretex® is a suitable membrane. Goretex® is a microporous membrane containing pores that are too small for liquid to pass through, but are large enough to let gas through.

In accordance to one aspect of the present invention, at least outer casing 12 and liner 14 are made integral with each other, i.e., made substantially at the same time or substantially in the same processing step. Hence, at region 24 where valve 18 is inserted into cartridge 10, outer casing 12 and liner 14 merge together and become substantially one integral mass as best shown in FIG. 4. Advantages of an integral construction include, but are not limited to, an inherent seal between the liner and the casing and reduction in manufacturing costs by eliminating the steps of fabricating these components separately and then assembling them, among others. Valve 18 can be attached to cartridge 10 by press fitting, ultrasonic welding, adhesives, UV bonding, and hot melt, among others. While integral cartridges can be manufactured by various methods, a preferred manufacturing method is blow molding, discussed below.

The basic process of blow molding is known in the art. It is often used to manufacture hollow products such as plastic bottles for holding drinks, detergents or other liquids. Common blowable resins include polyethylene of various densities, polyethylene teraphthalate, polypropylene, polyvinyl chloride, thermoplastic elastomers, polystyrene, and fluoropolymers, among others. The basic blow molding process consists of the steps of plasticizing or melting the plastic resin, forming a preform or a parison from the molten resin, blowing or inflating the molten resin with a blowing agent, e.g., a gas, until the molten resin meets the walls of a mold, and cooling/ejecting the formed hollow object. Basic blow molding is fully described in a number of references including "Understanding Blow Molding," by Norman C. Lee, Hanser Gardner Publications (2000), which is incorporated herein by reference.

Common blow molding processes include extrusion blow molding, where a tubular parison is extruded typically downward and a blow-pin is inserted into it and inflating it, and injection blow molding, where a parison is injection molded and moved to a blow mold while hot for inflation. Other processes include biaxial stretch blow molding and co-extrusion blow molding.

Co-extrusion blow molding is similar to extrusion blow molding and creates a container with multi-layer walls. These layers can be made from recycled or regrind polymers or virgin polymers. The layers can be designed for specialized functions, including UV resistance, fuel resistance, or impermeability, among others. The different layers are extruded together in a series of head and die assemblies before their extrusion as a parison and inflated. Two to seven or more layers can be achieved with co-extrusion blow molding. Typically the materials are selected so that the layers adhere to each other to form a single wall. Multi-layer liners or cartridges can decrease the permeability of the liner to gases, so that gases, e.g., atmospheric gases, cannot easily migrate into the liner or cartridge, and so that methanol vapor cannot easily leave the liner or cartridge.

In accordance to an aspect of the present invention, cartridge 10 with outer casing 12 and liner 14 are manufactured by co-extrusion blow molding, such that liner 14 and outer casing 12 are at least partially severable from each other except at or near region 24. Cartridge 10 can also have one or more intermediate layers between the casing and liner, and either the casing or the liner or both can have multiple layer construction. When liner 14 is at least partially severable from outer casing 12, liner 14 can collapse while fuel is being transported therefrom to reduce the amount of residual fuel trapped in the cartridge.

In one embodiment, the casing and the liner are made from incompatible polymers. As used herein, incompatibility refers to polymers or resins that cannot adhere to each other during a blow molding process, and compatibility refers to polymers or resins that can adhere to each other in the absence of ancillary adhesives or compatibilizers in a blow molding process. As discussed in commonly owned, co-pending application '244 previously incorporated by reference, suitable materials for the outer casing and inner liner include:

| Cartridge Components | Suitable Materials |
| --- | --- |
| Outer casing 12 | Low density polyethylene (LDPE), High density polyethylene (HDPE), polyacetal resin or acetal polyoxymethylene (POM), polypropylene (PP), polyethylene terephthalate (PET), Polyethylene naphthalate (PEN), nylon, metals, and blends thereof. |
| Inner liner 14 | Fluorinated LDPE, LDPE, laminate (PP, PE, ethylene vinyl acetate (EVA), fiberglass, microglass, polytetrafluoroethylene (PTFE)), ethylene vinyl alcohol (EVOH), Polyvinylidene Fluoride (PVDF) |

Some of these materials can be blow molded. The materials in contact with the fuel, e.g., acetal polyoxymethylene, fluorinated polyethylene and LDPE, are resistant to fuel. In other words, the fuel, namely methanol, does not significantly reduce or breakdown the materials. Inner liner 14 is preferably fluorinated to increase its resistance to methanol or to increase its impermeability to methanol. Fluorination and lamination are preferred ways to render a polymer more resistant to methanol fuel. Fluorination describes a process where at least one hydrogen atom in the polymer is removed and replaced with a fluorine atom. Perfluorination is a fluorination process where all the hydrogen atoms are replaced with fluorine atoms. Inner liner 14 or outer casing 12 can be made from a fluorinated polymer, or more preferably from a polymer and then the inner liner is fluorinated afterward, and as used herein the terms fluorination or fluorinated, etc. include articles made from fluorinated polymer and articles that is fluorinated after being formed.

Preferably, the fluorinated article contains at least one antioxidant. As used herein, antioxidant includes any chemical substance that can be added to the polymer to minimize the effects of oxygen degradation on the polymer. Such degradation may render a polymer brittle or increase its permeation rate/decrease its vapor barrier properties. Any antioxidant that can be mixed, blended with the polymer or reacted to form a part of the polymer can be used. Suitable antioxidants include, but are not limited to, quinoline type antioxidants, amine type antioxidants, phenolic type antioxidants, phosphite type antioxidants and mixtures and blends thereof.

Suitable examples of quinoline type antioxidants include, but are not limited to, polymerized 1,2-dihydro-2,2,4-trimethylquinoline-6-dodecyl-2,2,4-trimethyl-1,2-dihydro quinoline and 6-ethoxy-2,2,4-trimethyl-1-2-dihydroquinoline. See U.S. Pat. No. 6,569,927 to Gelbin.

Suitable examples of amine type antioxidants include, but are not limited to, N-phenyl-N'-cyclohexyl-p-phenylenediamine; N-phenyl-N'-sec-butyl-p-phenylenediamine; N-phenyl-N'-isopropyl-p-phenylenediamine; N-phenyl-N'-(1,3-dimethylbutyl)-p-phenylenediamine; N,N'-diphenyl-p-phenylenediamine; N,N'-bis-(1,4-dimethylpentyl)-p-phenylenediamine; N,N'-di-beta naphthyl-p-phenylenediamine; mixed diaryl-p-N,N'-bis-(1-ethyl-3-methylpentyl)-p-phenylenediamines; and N,N'-bis-(1methylheptyl)-p-phenylenediamine. See '927 patent.

Suitable examples of phenolic type antioxidants include, but are not limited to, 1,2-bis(3,5-di-t-butyl-4-hydroxyhydrocinnamoyl)hydrazine, 1,3,5-trimethyl-2,4,6-tris(3,5-di-t-butyl-4-hydroxybenzyl)benzene, 1,3,5-tris(3,5-di-t-butyl-4-hydroxybenzyl)-s-triazine-2,4,6(1H,3H,5H)trione, 1,3,5-tris (4-t-butyl-3-hydroxy-2,6-dimethylbenzyl)-s-triazine-2,4,6-(1H,3H,5H)trione, 2-t-butyl-4,6-dimethyl phenol, 2,2'-methylenebis(4-ethyl-6-t-butyl-phenol), 2,2'-methylenebis (4-methyl-6-t-butyl phenol), 2,4-dimethyl-6-octyl-phenol, 2,4-dimethyl-6-t-butyl phenol, 2,4,6-tri-t-butyl phenol, 2,4, 6-triisopropyl phenol, 2,4,6-trimethyl phenol, 2,6-di-t-butyl-4-ethyl phenol, 2,6-di-t-butyl-4-methyl phenol, 2,6-di-t-butyl-4-n-butyl phenol, 2,6-dioctadecyl-4-methyl phenol, 2,6-methyl-4-didodecyl phenol. 3,5-di-t-butyl-4-hydroxyhydrocinnamic acid triester with 1,3,5-tris(2-hydroxyethyl)-5-triazine-2,4,6(1H,3H,5H)-trione; bis(3,3-bis(4-hydroxy-3-t-butylphenyl)butanoic acid)glycolester, 4-hydroxymethyl-2,6-di-t-butyl phenol, octadecyl 3,5-di-t-butyl-4-hydroxy-hydrocinnamate, tetrakis{methylene(3,5-di-t-butyl-4-hydroxy-hydrocinnamate)}methane, 2,2'-oxamido-bis {ethyl-3-(3,5-di-t-butyl-4-hydroxyphenyl) }propionate, and 1,3,5-trimethyl-2,4,6-tris(3,5-di-t-butyl-4-hydroxybenzyl)benzene. See '927 patent. Additional examples of phenolic type antioxidants can be found in U.S. Pat. No. 4,839,405 to Speelman, et al.

Suitable examples of phosphite type antioxidants include, but are not limited to, tris(2,4-tert-butyl-phenyl)phosphite), tris(mononylphenyl)phosphite, tris(dinonylphenyl)phosphite, distearylpentaerythritol diphosphite and dioctylpentaerythritol diphosphite. See U.S. Pat. No. 6,326,072 to Ojeda et al.

Alternatively, inner liner can be made from a laminate having at least two layers. The materials for the laminate are selected from PP, PE, EVOH, EVA, fiberglass, microglass and PTFE, as discussed in the table above. Advantageously, PP, PE, EVA and PTFE can be co-extrusion blow molded as a multilayer laminate for liner 14. The suitable materials listed above are non-exhaustive and other materials can be used.

A known test can be used to select whether polymers suitable for the liner would be incompatible with polymers suitable for the casing. In this test, samples of a liner polymer and a casing polymer preferably in powder or fiber form are melted together. Depending on the melting temperatures of the polymers, the mixture is heated and melted in a container, e.g., a metal pan or ceramic crucible. The melt is then cooled or quenched. Since the first polymer to melt may migrate to the bottom of the container, the cooled blend may be etched with a solvent, e.g., ethanol, to re-mix both components. The blend can be reheated to re-melt and to encourage crystal growth. The surface of the blend can be inspected by microscope to determine whether the polymer components exist in different phases and therefore are incompatible. Additionally, the surface can be inspected with a scanning electron microscope after the surface is coated with a reflective material, e.g., gold by a sputtering method. This test is known in the art and is fully disclosed in "Study of Dispersion of Polyethylene Oxide in Polypropylene" by S. Iyer, November 2000 and available at www.rit.edu/~bekpph/sem/Projects/Iyer. The present invention is not limited to any particular test to determine incompatibility.

Alternatively, suitable polymers for the inner liner and the outer casing polymers can be selected from polar resins and non polar resins, which are incompatible to each other. Polar resins include acrylonitrile butadiene styrene (ABS), polyethylene teraphthalate (PET), polyvinyl chloride (PVC), polycarbonate (PC), nylon (such as polysulfones and polyarylene sulfides), polyarene ethers (such as polyphenylene oxide, polyether ketones, polyether ether ketones, acetate, acrylic-polyvinyl chloride copolymer) and thermoplastic polyurethane (TPU). Non-polar resins include high density polyethylene (HDPE), polypropylene (PP) and polystyrene. While a polar resin is compatible with a polar resin and a non-polar resin is compatible with a non-polar resin, a polar resin is incompatible with a non-polar resin. Usage of compatible polar and non-polar resins in blow molding is discussed in U.S. published patent application No. 2002/0094427A1, which is incorporated herein by reference in its entirety.

Other known examples of incompatible polymers include thermoplastic elastomers (TPE), such as Santropene®, Vyram® or Trefsin®, which are incompatible with acetal and PVC. In one example, the casing can be acetal polyoxymethylene (POM) and the liner can be a TPE. Trefsin® is a butyl rubber TPE and is known to be relatively impermeable to fluids and gases and resistant to chemical and heat.

In accordance with another aspect of the present invention, slip agents can be used to promote incompatibility. In one example, polyethylene (PE) is incompatible with slip agents such as long-chain fatty acid amides. Slip agents incorporated into PE in its molten form would migrate to the surface as PE cools. The initial migration rate of slip agents can be high until a thin film is formed on the surface. This thin film of slip agents contributes to the separation of the layers within the blow molded cartridge. Suitable slip agents for PE include amides of oleic acid (oleamide) and erucic acid (erucamide). The slip agents can be added to either the liner or the casing or to any intermediate layer(s) to promote separation of the liner from the casing. Alternatively, fillers that absorb moisture, such as calcium carbonate or talc, can be added to the polymers to promote incompatibility.

Also, if PE is selected as either the casing or the liner, a wax can be blow molded between the casing and the liner. Waxes, such as paraffin wax, microcrystalline wax or synthetic wax, are known to be incompatible with PE.

In accordance with another aspect of the invention, the co-extrusion blow molding is conducted serially, hereinafter serial or sequential blow molding. First, the casing is extruded and blown to a predetermined thickness and strength. The casing is cooled sufficiently before the liner is extruded and blown against the cooled casing. Due to the temperature difference, the liner would not bond with the casing allowing the liner to be at least partially severable from the casing, except at or near region 24. This is an exemplary method of making a cartridge with integral casing and liner. Alternatively, instead of waiting for the casing to cool, an intermediate wax layer is extruded and blown before the liner is extruded and blown.

In accordance with another aspect of the present invention, outer casing 12 is pre-made. In other words, it is made before inner liner 14 is blow molded. Outer casing 12 can be injection molded, compression molded, or blow-molded. Inner liner 14 can be inserted directly into pre-made outer casing 12. If casing 12 is made from a material incompatible with inner liner 14 or if casing 12 is cooled, than liner 14 would be at least severable from casing 12, as discussed above. Alternately, a wax layer can be deposited between casing 12 and inner liner 14.

Figure 5A:
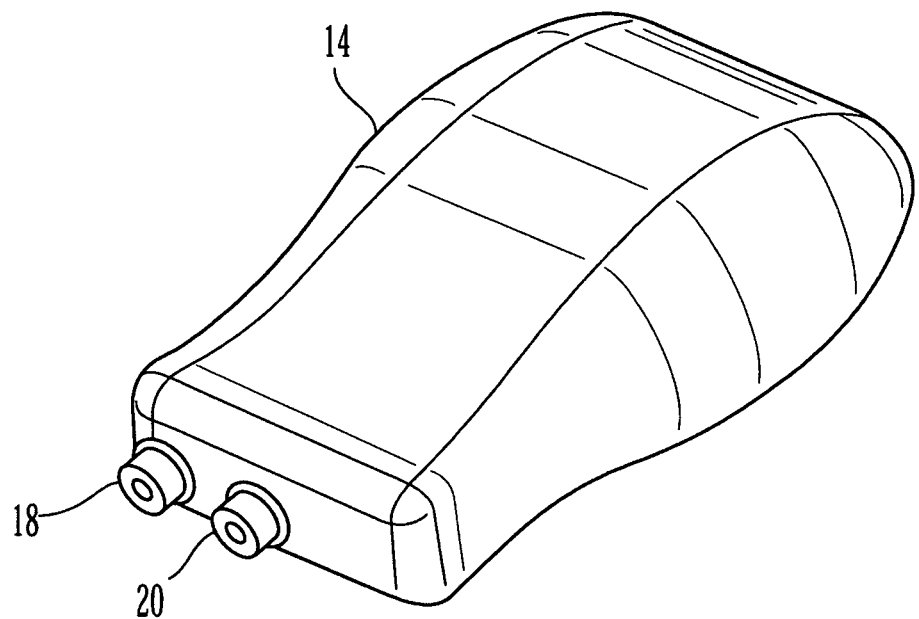
FIGS. 5A and 5B are perspective views of exemplary inner liners.

When outer casing 12 is pre-made, inner liner 14 when fully inflated or filled can have a volume greater than the volume of outer casing 12. As shown in FIG. 5A, liner 14 is relatively larger in volume than outer casing 12, such that when liner 14 is inserted into outer casing 12 its skin folds inside outer casing 12. An advantage of having a relatively larger inner liner is that it releases local stress at the right angle corners of inner liner 14, shown in FIG. 4. The wall thickness at sharp corners is typically less in a blow molded article. The liner shown in FIG. 5A has no sharp corner to obviate local stresses.

Figure 5B:
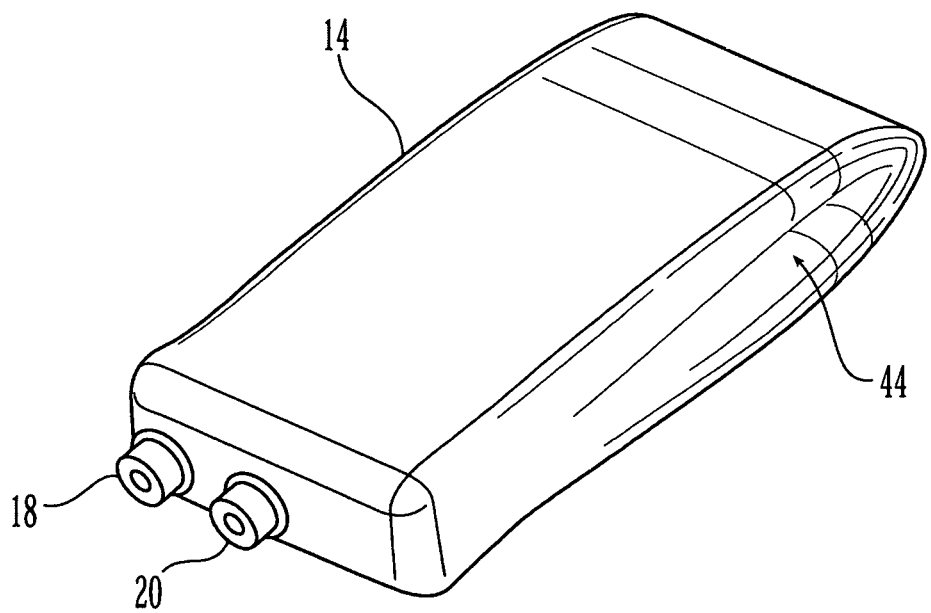

Inner liner 14 can be blow molded into a mold configured to produce readily foldable or collapsible sidewalls, e.g., accordion shape side walls or folded sidewalls as shown in FIG. 5B. As shown, inner liner 14 has at least one fold 44 formed on the side. Alternatively, inner liner 14 can be blow molded into the shape shown in FIG. 5A and the fold can be formed thereafter. An advantage of forming the fold(s) is that as fuel is being withdrawn from the liner, the liner walls would collapse along the fold(s) in a predetermined way to maximize the extraction of fuel from the liner, while using the least amount of energy or power to remove the fuel from the liner or cartridge.

After the casing and the liner are blow molded, valve 18 is inserted into neck area 24. An ultrasonic welder (not shown) melts the plastic materials designated as neck area 24 to seal valve body 30 to outer casing 12.

The application of ultrasonic energy to join plastic components has been utilized in many industries. In ultrasonic welding, a solid-state power supply transforms electrical energy to 20 kHz or 40 kHz ultrasonic energy. A converter changes this electrical energy into ultrasonic mechanical vibratory energy. A horn transmits the ultrasonic mechanical energy directly to the parts to be assembled. A combination of applied force, surface friction, and intermolecular friction at the mating surface between the parts to be joined elevates the temperature until the melting points of the materials are reached. Force is maintained after the vibrations cease and a molecular bond or weld at the interface is produced. A more complete discussion of ultrasonic welding is found in U.S. Pat. No. 6,115,902, entitled "Method of Manufacturing a Razor," and assigned to BIC Corporation. The '902 patent is incorporated herein by reference in its entirety. To affect a seal, the joined materials should be similar or compatible. Preferably, the joined materials are chemically similar or have similar melting points so that both are melted at about the same time.

The inner liner and/or outer casing or any other component of cartridge 10 can be coated with a layer of protective material for wear resistance or other purposes. A suitable protective material is silicon dioxide ($SiO_2$), which can be applied by vapor deposition or sputtering technique or other known methods. Silica molecules coalesce on a substrate as $SiO_x$ where x is 1 or 2. Other suitable coatings include, but are not limited to, aluminum oxide $Al_2O_3$, $SnO_2(nH_2O)$, $H_4SiW_{12}O_2$ ($28H_2O$), tin mordernite/$SnO_2$ composite, zirconium phosphate-phosphate/silica composite, among others. These coatings are disclosed in EP patent application number 1,427,044A2, which is incorporated herein by reference in its entirety.

Aluminum and chrome can be sprayed or painted on the liner or casing to provide a barrier to gas transmission through the component. Aluminum and other metals can also be deposited by a sputtering technique. Any low gas permeability material that can be suspended in a solvent can be painted or otherwise applied.

Other suitable coatings include, but are not limited to the class of epoxy-aamine coatings, which are resistant to water vapor and other gases, such as oxygen and carbon dioxide to decrease the vapor permeability of the cartridge or the inner liner. Such coatings are commercially available as Bairocade® coatings from PPG Industries, Inc. in Cleveland, Ohio. This type of coatings can be applied using electro-static guns and cured in infrared ovens to create the gas barrier. The coatings can also be applied by dipping, spraying or painting. These coatings are typically used to coat beverage bottles or cans to protect the beverages inside.

Other suitable low gas permeability coatings include (i) a substantially ungelled resin or reaction product formed from reacting an epoxy functional polyester with an amine, disclosed in U.S. Pat. No. 6,417,292, (ii) a carboxylated amide polymers disclosed in U.S. Pat. No. 4,174,333 and (iii) a water based coating composition prepared by dissolving or dispersing in aqueous medium and at least a partially neutralized reaction product of a polyepoxide and an amino acid disclosed U.S. Pat. No. 4,283,428. These patent references are incorporated herein in their entireties. Polyvinylidene chloride copolymers (PVDC) is also a suitable coating.

In accordance with another aspect of the present invention, a clear polycrystalline, amorphous linear xylylene polymer may coat the inner and/or outer surface of the inner liner and/or the outer casing to decrease the permeability of the inner liner and outer casing to gas. Xylylene polymer is commercially available as Parylene® from Specialy Coating Systems. Three suitable Parylene resins are Parylene N (poly-para-xylylene), Parylene C (poly-monochloro-para-xylylene) and Parylene D (poly-dichloro-para-xylylene). These resins have the following structures, respectively:

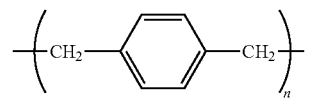

n > 5000
Parylene N
(poly-para-xylylene)

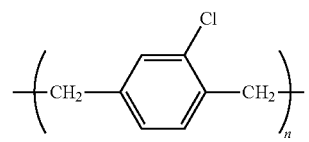

n > 5000
Parylene C
(poly-monochloro-para-xylylene)

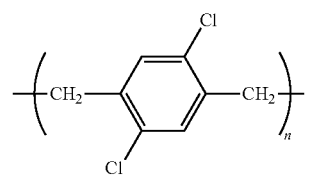

n > 5000
Parylene D
(poly-dichloro-para-xylene)

Xylylene is coated on to a substrate, e.g., inner liner or outer casing, by vapor deposition polymerization process. This process forms coating from a gaseous monomer without an intermediate liquid phase. Hence, no solvent, plasticizer, catalyst or accelerant is necessary. Dimer xylylene in powder form is heated to heated to about 150° C. and is changed to a vapor state. Next, the dimer molecule is heated to 690° C., 0.5 torr. to change the molecular structure to a monomer structure. The vapor monomers coat the substrate and when cooled to room temperature, the monomer becomes a polymer, bonding to the substrate. This process is illustrated below:

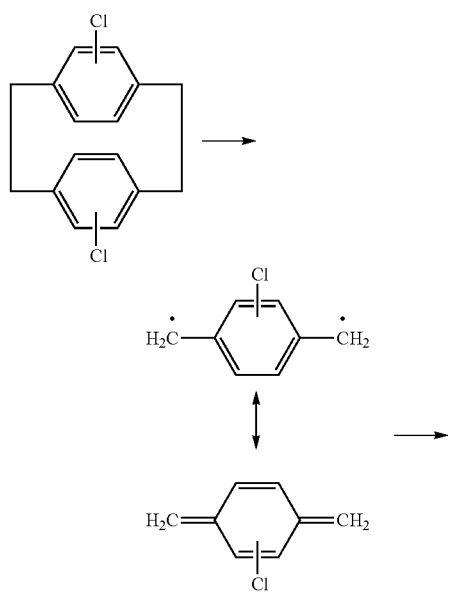

-continued

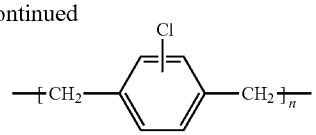

As a result, substrates with sharp edges or challenging contours can be coated uniformly and without pinholes or voids. Coatings as thin as 0.1 mil can be deposited. Xylylene is also insoluble in most common solvents, including organic solvents, inorganic reagents and acids.

Xylylene is compatible with many plastics, such as polypropylene and high density polyethylene and many metals, such as stainless steel. In general, xylylene is compatible with stainless steel, tantalum, titanium, nitinol, gold, platinum, inconel, iridium, silver, tungsten, alloys of any of these metals, carbon or carbon fiber, cellulose acetate, cellulose nitrate, silicone, polyethylene terephthalate, polyurethane, polyamide, polyester, polyorthoester, polyanhydride, polyether sulfone, polycarbonate, polypropylene, high molecular weight polyethylene, polytetrafluoroethylene, mixtures or copolymers of these polymers, polylactic acid, polyglycolic acid or copolymers thereof, a polyanhydride, polycaprolactone, polyhydroxybutyrate valerate or mixtures or copolymers of these. Hence, xylylene can also coat sealing members (such as O-ring 38), components of valve 18 (such as stainless steel plunger 32 and spring 34), and any other components of in cartridge 10.

In accordance with another aspect of the present invention, a gas barrier film is wrapped around the inner liner and/or the outer casing to decrease the gas permeation rate of the cartridge. A suitable barrier film is a bi-axially oriented, thermoplastic polyester film. This polyester film is a polyethylene terephthalate made from ethylene glycol and-dimethyl terephthalate. This polyester film is commercially available as Mylar® from DuPont and is typically coated on one side with a PVDC copolymer. Polyethylene terephthalate film can also be coated with silicone dioxide, as discussed above, to improve its barrier properties.

Mylar is heat sealable. This film is resistant to most common solvents and has good barrier properties to oxygen and moisture. Mylar also available as a multi-layer laminate Mylar SBL (Super Barrier Laminate). This laminate comprises non-foil barrier layers (metallized coatings and polymer-based coatings) and a heat sealable coating to provide a hermetic seal capable of maintaining a vacuum. The reported oxygen transmission rate is <0.00004" cc/100 sq.in./d (23° C./50% relative humidity), which is an indicator of atmospheric gas permeation rate. The reported water vapor transmission rate is 0.0003 g/100 sq.in./d (23° C./50% relative humidity).

Other suitable barrier films were tested and disclosed in "Characterization of Thin Film Polymers Through Dynamic Mechanical Analysis and Permeation" by H. M. Herring, Lockheed Martin Engineering & Sciences for NASA Langley Research Center, June 2003 and available at http://techreports.larc.nasa.gov/ltrs/PDF/2003/cr/NASA-2003-cr212422.pdf). This reference is incorporated herein by reference in its entirety. The tested barrier films include polyurethane (available as PUR from 3M), ethylene vinyl alcohol bonded to polyester substrate (available as Eval-F from Evalca), polyimide (available as Kapton from DuPont), polyethylene terephthalate (available as Mylar-from DuPont), and fluoro-polymers (available as Paint Rep. from 3M and as Tedlar from DuPont). The test results confirm the good vapor barrier properties of polyethylene terephthalate (Mylar). Polyurethane has the lowest barrier properties in the range of 2.5-3.0 ($\times 10^{-6}$) mol/m.sec.Pa under various conditions. Fluoro-polymers (Tedlar) and polyimide (Kapton) have higher barrier properties at less than about 1 2.5-3.0 ($\times 10^{-6}$) mol/m.sec.Pa under various conditions. Hence, films that have gas barrier properties higher than or equal to polyurethane is suitable for use in the present invention. In other words, the gas or vapor transmission rate of suitable films should be the same as or lower than the vapor transmission rate of polyurethane. Preferably, the vapor transmission rate is lower than the vapor transmission rate of polyurethane.

Additional suitable barrier films include those known in the food packaging industry. These include polyvinyl alcohol (PVOH), ethylene vinyl alcohol (EVOH), polyvinylidene chloride copolymers (PVDC or Saran), nylon resins (including nylon 6, nylon 66 and aromatic/amorphous nylons), polyacrylonitrile (PAN), polyethylene naphthalate (PEN), poly(trimethlylene terephthalate) (PTT), resorcinol copolymers, liquid crystal polymers, aliphatic polyketones (PK), and blends and copolymers of these materials. These barrier films are fully disclosed in "A Twenty-Year Retrospective on Plastics: Oxygen Barrier Packaging Materials" by G. Strupinsky and A. Brody from the Rubbright*Brody, Inc.

Other suitable films can also include polyvinyl chloride (PVC).

The barrier coatings and barrier films disclosed herein can cover all the surfaces of the liner or casing or less than all of the surfaces. Substantial reduction of the permeation rate can be accomplished by less than 100% coating/film coverage. For example, surface areas around valve 18 can remain uncovered or pinhole tears in the film or coating can be tolerated without significant adverse effect to the reduced permeation rate. The barrier coating can coat the inside and/or the outside of the liner or casing. Furthermore, the liner and/or casing can be barrier coated and wrapped with a barrier film, e.g., a portion of the liner and/or casing is barrier coated and another portion is wrapped with the barrier film, or the liner and/or casing can be barrier coated and then the coated surface is wrapped with a barrier film.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

We claim:
1. A fuel supply for a fuel cell comprising:
an outer casing,
a collapsible inner liner containing liquid fuel, and
a valve component adapted to transport fuel from the fuel supply to a fuel cell, wherein the outer casing and the inner liner comprise polymers that are incompatible to each other, wherein incompatible polymers do not adhere to each other in their molten state and wherein as the fuel is transported from the fuel supply to the fuel cell, the inner liner at least partially collapses, wherein one of the outer casing and inner liner comprises a polar resin and the other one of the outer casing and inner liner comprises a non-polar resin.
2. The fuel supply of claim 1, wherein the polar resins comprise acrylonitrile butadiene styrene, thermoplastic polyesters, polycarbonates, polyvinyl chloride, polyamides, polyarylene ethers, or thermoplastic polyurethanes.

3. The fuel supply of claim 2, wherein the thermoplastic polyesters comprise polyethylene terephthalate (PET).

4. The fuel supply of claim 2, wherein the polyamides comprise nylon, polysulfones or polyarylene sulfides.

5. The fuel supply of claim 2, wherein the polyarylene ethers comprise polyphenylene oxide, polyether ketones, polyetherether ketones, acetate, or acrylic-polyvinyl chloride copolymer.

6. The fuel supply of claim 1, wherein the non-polar resins comprise high density polyethylene (HDPE), polypropylene or polystyrene.

7. A fuel supply for a fuel cell comprising:
an outer casing,
a collapsible inner liner containing liquid fuel, and
a valve component adapted to transport fuel from the fuel supply to a fuel cell, wherein the outer casing and the inner liner comprise polymers that are incompatible to each other, wherein incompatible polymers do not adhere to each other in their molten state and wherein as the fuel is transported from the fuel supply to the fuel cell, the inner liner at least partially collapses, wherein one of the polymers is a thermoplastic elastomer.

8. The fuel supply of claim 7, wherein the thermoplastic elastomer comprises butyl rubber.

9. The fuel supply of claim 8, wherein the inner liner comprises butyl rubber.

10. The fuel supply of claim 7, wherein the other polymer comprises acetal.

11. The fuel supply of claim 7, wherein the other polymer comprises polyvinylchloride.

12. A fuel supply for a fuel cell comprising:
an outer casing,
a collapsible inner liner containing liquid fuel, and
a valve component adapted to transport fuel from the fuel supply to a fuel cell, wherein the outer casing and the inner liner comprise polymers that are incompatible to each other, wherein incompatible polymers do not adhere to each other in their molten state and wherein as the fuel is transported from the fuel supply to the fuel cell, the inner liner at least partially collapses, wherein at least one of the outer casing and inner liner comprises polyethylene, and wherein the other one of the outer casing and inner liner comprises a slip agent.

13. The fuel supply of claim 12, wherein the slip agent comprises a long chain fatty acid amide.

14. The fuel supply of claim 13, wherein the long chain fatty acid amide is oleamide.

15. The fuel supply of claim 13, wherein the long chain fatty acid amide is erucamide.

16. A fuel supply for a fuel cell comprising:
an outer casing,
a collapsible inner liner containing liquid fuel, and
a valve component adapted to transport fuel from the fuel supply to a fuel cell, wherein the outer casing and the inner liner comprise polymers that are incompatible to each other, wherein incompatible polymers do not adhere to each other in their molten state and wherein as the fuel is transported from the fuel supply to the fuel cell, the inner liner at least partially collapses, wherein at least one of the outer casing and inner liner comprises hydrophilic filler.

17. The fuel supply of claim 16, wherein the hydrophilic filler is talc.

18. The fuel supply of claim 16, wherein the hydrophilic filler is calcium carbonate.

19. A fuel supply for a fuel cell comprising:
an outer casing,
a collapsible inner liner containing liquid fuel, and
a valve component adapted to transport fuel from the fuel supply to a fuel cell, wherein the outer casing and the inner liner comprise polymers that are incompatible to each other, wherein incompatible polymers do not adhere to each other in their molten state and wherein as the fuel is transported from the fuel supply to the fuel cell, the inner liner at least partially collapses, wherein the fuel supply further comprises an intermediate layer disposed between the outer casing and the inner liner wherein the intermediate layer is incompatible with at least one of the outer casing or inner liner.

20. The fuel supply of claim 19, wherein the intermediate layer is made from a wax.

21. The fuel supply of claim 20, wherein the wax comprises paraffin wax, microcrystalline wax or synthetic wax.

22. A fuel supply for a fuel cell comprising:
an outer casing,
a collapsible inner liner containing liquid fuel, and
a valve component adapted to transport fuel from the fuel supply to a fuel cell, wherein the outer casing and the inner liner comprise polymers that are incompatible to each other, wherein incompatible polymers do not adhere to each other in their molten state and wherein as the fuel is transported from the fuel supply to the fuel cell, the inner liner at least partially collapses, wherein the outer casing and the inner liner comprise sequentially blow molded outer casing and inner liner, wherein the fuel supply further comprises an intermediate layer disposed between the outer casing and the inner liner wherein the intermediate layer is incompatible with at least one of the outer casing or inner liner, and intermediate layer comprises a blow molded layer.

23. The fuel supply of claim 22, wherein the intermediate layer is made from a wax.

24. The fuel supply of claim 23, wherein the wax comprises paraffin wax, microcrystalline wax or synthetic wax.

25. A fuel supply for a fuel cell comprising:
an outer casing,
a collapsible inner liner containing liquid fuel, and
a valve component adapted to transport fuel from the fuel supply to a fuel cell, wherein the outer casing and the inner liner comprise polymers that are incompatible to each other, wherein incompatible polymers do not adhere to each other in their molten state and wherein as the fuel is transported from the fuel supply to the fuel cell, the inner liner at least partially collapses, wherein at least one of the outer casing or inner liner is coated with a gas barrier material.

26. A fuel supply for a fuel cell comprising:
an outer casing,
a collapsible inner liner containing liquid fuel, and
a valve component adapted to transport fuel from the fuel supply to a fuel cell, wherein the outer casing and the inner liner comprise polymers that are incompatible to each other, wherein incompatible polymers do not adhere to each other in their molten state and wherein as the fuel is transported from the fuel supply to the fuel cell, the inner liner at least partially collapses, wherein at least one of the outer casing or inner liner is wrapped with a gas barrier film.

27. A fuel supply for a fuel cell comprising:
an outer casing,
a collapsible inner liner containing liquid fuel, and
a valve component adapted to transport fuel from the fuel supply to a fuel cell, wherein the inner liner and the outer casing merge together and become substantially one integral mass at a region proximate to the location of the valve component and wherein as the fuel is transported from the fuel supply to the fuel cell, the inner liner at least partially collapses.

28. The fuel supply of claim 27, wherein the outer casing comprises a blow molded outer casing and the inner liner comprises a blow molded inner liner.

29. The fuel supply of claim 28, wherein the outer casing and the inner liner are co-extruded, blow molded outer casing and inner liner.

30. The fuel supply of claim 28, wherein the outer casing and the inner liner comprise sequentially blow molded outer casing and inner liner.

31. A fuel supply for a fuel cell comprising:
an outer casing,
a collapsible inner liner containing liquid fuel, and
a valve component adapted to transport fuel from the fuel supply to a fuel cell, wherein the inner liner and the outer casing merge together and become substantially one integral mass at a region proximate to the location of the valve component and wherein as the fuel is transported from the fuel supply to the fuel cell, the inner liner at least partially collapses,
wherein the outer casing comprises a blow molded outer casing and the inner liner comprises a blow molded inner liner,
wherein the outer casing and the inner liner comprise sequentially blow molded outer casing and inner liner, and
wherein the outer casing and the inner liner are made from the same polymer.

32. A fuel supply for a fuel cell comprising:
an outer casing,
a collapsible inner liner containing liquid fuel, and
a valve component adapted to transport fuel from the fuel supply to a fuel cell, wherein the inner liner and the outer casing merge together and become substantially one integral mass at a region proximate to the location of the valve component and wherein as the fuel is transported from the fuel supply to the fuel cell, the inner liner at least partially collapses,
wherein the outer casing comprises a blow molded outer casing and the inner liner comprises a blow molded inner liner,
wherein the outer casing and the inner liner comprise sequentially blow molded outer casing and inner liner, and
wherein the outer casing and the inner liner are made from polar polymers.

33. A fuel supply for a fuel cell comprising:
an outer casing,
a collapsible inner liner containing liquid fuel, and
a valve component adapted to transport fuel from the fuel supply to a fuel cell, wherein the inner liner and the outer casing merge together and become substantially one integral mass at a region proximate to the location of the valve component and wherein as the fuel is transported from the fuel supply to the fuel cell, the inner liner at least partially collapses,
wherein the outer casing comprises a blow molded outer casing and the inner liner comprises a blow molded inner liner,
wherein the outer casing and the inner liner comprise sequentially blow molded outer casing and inner liner, and
wherein the outer casing and the inner liner are made from non-polar polymers.

34. The fuel supply of claim 27, wherein at least one of the outer casing or inner liner is coated with a gas barrier material.

35. A fuel supply for a fuel cell comprising:
an outer casing,
a collapsible inner liner containing liquid fuel, and
a valve component adapted to transport fuel from the fuel supply to a fuel cell, wherein the inner liner and the outer casing merge together and become substantially one integral mass at a region proximate to the location of the valve component and wherein as the fuel is transported from the fuel supply to the fuel cell, the inner liner at least partially collapses,
wherein at least one of the outer casing or inner liner is coated with a gas barrier material wherein the barrier material comprises epoxy-amine.

36. A fuel supply for a fuel cell comprising
an enclosed outer casing,
a collapsible inner liner containing liquid fuel disposed inside the enclosed outer casing, and
a valve component adapted to transport fuel from the fuel supply to the fuel cell adapted to provide electricity for an electronic device,
wherein as the fuel is transported from the fuel supply to the fuel cell, the inner liner at least partially collapses and wherein the inner liner has a volume capacity higher than that of the outer casing and wherein the inner liner has at least one fold formed thereon, wherein at least one of the outer casing or inner liner is wrapped with a gas barrier film.

37. A fuel supply for a fuel cell comprising
an enclosed outer casing,
a collapsible inner liner containing liquid fuel disposed inside the enclosed outer casing, and
a valve component adapted to transport fuel from the fuel supply to the fuel cell adapted to provide electricity for an electronic device.,
wherein as the fuel is transported from the fuel supply to the fuel cell, the inner liner at least partially collapses and wherein the inner liner has a volume capacity higher than that of the outer casing and wherein the inner liner has at least one fold formed thereon, wherein at least one of the outer casing or inner liner is fluorinated.

38. The fuel supply of claim 37, wherein said at least one of the outer casing or inner liner is made from a polymer containing at least one antioxidant.

39. A fuel supply for a fuel cell comprising
an enclosed outer casing,
a collapsible inner liner containing liquid fuel disposed inside the enclosed outer casing, and
a valve component adapted to transport fuel from the fuel supply to the fuel cell adapted to provide electricity for an electronic device,
wherein as the fuel is transported from the fuel supply to the fuel cell, the inner liner at least partially collapses and wherein the inner liner has a volume capacity higher than that of the outer casing and wherein the inner liner has at least one fold formed thereon, wherein at least one of the outer casing or inner liner is made from a polymer containing at least one antioxidant.

40. A fuel supply for a fuel cell comprising
an outer casing,
a collapsible inner liner containing liquid fuel, and
a valve component adapted to transport fuel from the fuel supply to the fuel cell adapted to provide electricity for an electronic device, and a non-metallic coating on an outermost surface of at least one of the outer casing or inner liner to increase its vapor barrier and wherein as the fuel is transported from the fuel supply to the fuel cell, the inner liner at least partially collapses wherein the non-metallic coating comprises a gas barrier coating, wherein the gas barrier coating comprises epoxy-amine.

41. A fuel supply for a fuel cell comprising
an outer casing,
a collapsible inner liner containing liquid fuel, and
a valve component adapted to transport fuel from the fuel supply to the fuel cell adapted to provide electricity for an electronic device, and
a non-metallic coating on an outermost surface of at least one of the outer casing or inner liner to increase its vapor barrier and wherein as the fuel is transported from the fuel supply to the fuel cell, the inner liner at least partially collapses wherein the non-metallic coating comprises a gas barrier coating, wherein the gas barrier coating comprises silicone oxide.

42. A fuel supply for a fuel cell comprising
an outer casing,
a collapsible inner liner containing liquid fuel, and
a valve component adapted to transport fuel from the fuel supply to the fuel cell adapted to provide electricity for an electronic device, and
a non-metallic coating on an outermost surface of at least one of the outer casing or inner liner to increase its vapor barrier and wherein as the fuel is transported from the fuel supply to the fuel cell, the inner liner at least partially collapses wherein the non-metallic coating comprises a gas barrier coating, wherein the gas barrier coating comprises a material selected from a group consisting of a substantially ungelled resin or reaction product formed from reacting an epoxy functional polyester with an amine, a carboxylated amide polymers and a water based coating composition prepared by dissolving or dispersing in aqueous medium and at least a partially neutralized reaction product of a polyepoxide and an amino acid.

43. A fuel supply for a fuel cell comprising
an outer casing,
a collapsible inner liner containing liquid fuel, and
a valve component adapted to transport fuel from the fuel supply to the fuel cell adapted to provide electricity for an electronic device, and
a non-metallic coating on an outermost surface of at least one of the outer casing or inner liner to increase its vapor barrier and wherein as the fuel is transported from the fuel supply to the fuel cell, the inner liner at least partially collapses wherein the non-metallic coating comprises a gas barrier coating, wherein the gas barrier coating comprises xylylene.

44. The fuel supply of claim 43, wherein the xylylene comprises poly-monochloro-para-xylylene.

45. The fuel supply of claim 43, wherein the xylylene comprises poly-para-xylylene.

46. The fuel supply of claim 43, wherein the xylylene comprises poly-dichloro-para-xylylene.

47. A fuel supply for a fuel cell comprising
an outer casing,
a collapsible inner liner containing liquid fuel, and
a valve component adapted to transport fuel from the fuel supply to the fuel cell adapted to provide electricity for an electronic device, and
a non-metallic coating on an outermost surface of at least one of the outer casing or inner liner to increase its vapor barrier and wherein as the fuel is transported from the fuel supply to the fuel cell, the inner liner at least partially collapses wherein the non-metallic coating comprises a gas barrier film wrapped around at least one of the outer casing or inner liner.

48. The fuel supply of claim 47, wherein the gas barrier film comprises polyethylene teraphthalate.

49. The fuel supply of claim 48, wherein the polyethylene teraphthalate is coated with apolyvinylidene chloride copolymer.

50. The fuel supply of claim 48, wherein the polyethylene teraphthalate is coated with silicone dioxide.

51. The fuel supply of claim 48, wherein the polyethylene teraphthalate forms a part of a laminate.

52. The fuel supply of claim 47, wherein the gas barrier film's vapor transmission rate is substantially the same as that of polyurethane or lower.

53. The fuel supply of claim 52, wherein the gas barrier film's vapor transmission rate is lower than that of polyurethane.

54. The fuel supply of claim 47, wherein the gas barrier film is selected from a group consisting of polyvinyl alcohol (PVOH), ethylene vinyl alcohol (EVOH), EVOH bonded to a polyester substrate, polyvinylidene chloride copolymers (PVDC or Saran), nylon resins, fluoro-polymers, polyacrylonitrile (PAN), polyethylene naphthalate (PEN), poly(trimethylene terephthalate) (PTT), resorcinol copolymers, liquid crystal polymers, aliphatic polyketones (PK), and blends and copolymers of these materials.

55. A fuel supply for a fuel cell comprising
an outer casing,
a collapsible inner liner containing liquid fuel, and
a valve component adapted to transport fuel from the fuel supply to the fuel cell adapted to provide electricity for an electronic device, wherein the at least one of the outer casing or inner liner contains at least one antioxidant to increase its vapor barrier and wherein as the fuel is transported from the fuel supply to the fuel cell, the inner liner at least partially collapses.

56. The fuel supply of claim 55, wherein the antioxidant comprises a quinoline type antioxidant.

57. The fuel supply of claim 55, wherein the antioxidant comprises an amine type antioxidant.

58. The fuel supply of claim 55, wherein the antioxidant comprises a phenolic type antioxidant.

59. The fuel supply of claim 55, wherein the antioxidant comprises a phosphite type antioxidant.

60. The fuel supply of claim 55, wherein the at least one of the outer casing or inner liner comprises a fluorinated polymer.

* * * * *